(12) United States Patent
Yarde et al.

(10) Patent No.: US 7,461,335 B2
(45) Date of Patent: Dec. 2, 2008

(54) DYNAMIC CONVERSION OF DATA INTO MARKUP LANGUAGE FORMAT

(75) Inventors: Abhijeet Yarde, Bangalore (IN); Vinod Srinivasan, Bangalore (IN)

(73) Assignee: SAP AG, Walldorf (DE)

( * ) Notice: Subject to any disclaimer, the term of this patent is extended or adjusted under 35 U.S.C. 154(b) by 527 days.

(21) Appl. No.: 11/141,728

(22) Filed: May 31, 2005

(65) Prior Publication Data
US 2006/0271843 A1 Nov. 30, 2006

(51) Int. Cl.
G06F 17/00 (2006.01)
(52) U.S. Cl. .................................... 715/234
(58) Field of Classification Search ................ 715/500, 715/513, 200, 234
See application file for complete search history.

(56) References Cited

U.S. PATENT DOCUMENTS

| | | | |
|---|---|---|---|
| 6,604,100 | B1 | 8/2003 | Fernandez et al. |
| 6,635,089 | B1* | 10/2003 | Burkett et al. ............... 715/513 |
| 6,725,426 | B1 | 4/2004 | Pavlov |
| 6,785,673 | B1 | 8/2004 | Fernandez et al. |
| 6,901,403 | B1 | 5/2005 | Bata et al. |
| 7,134,072 | B1* | 11/2006 | Lovett et al. ................ 715/513 |
| 7,143,397 | B2 | 11/2006 | Imaura |
| 7,373,597 | B2* | 5/2008 | Hagerty et al. .............. 715/234 |
| 2002/0147747 | A1* | 10/2002 | Zaharkin ..................... 707/513 |
| 2003/0097637 | A1* | 5/2003 | Tozawa et al. .............. 715/513 |
| 2003/0161474 | A1* | 8/2003 | Matsuzaki et al. .......... 380/277 |
| 2003/0200507 | A1* | 10/2003 | Stern et al. .................. 715/517 |
| 2003/0208460 | A1* | 11/2003 | Srikant et al. ................ 707/1 |
| 2004/0103374 | A1* | 5/2004 | Chishima .................... 715/513 |
| 2004/0205463 | A1* | 10/2004 | Darbie ......................... 715/500 |
| 2004/0205578 | A1* | 10/2004 | Wolff et al. ................. 715/513 |
| 2004/0255235 | A1* | 12/2004 | Jung et al. ................. 715/500.1 |
| 2004/0258217 | A1* | 12/2004 | Kim ......................... 379/88.17 |
| 2004/0268231 | A1* | 12/2004 | Tunning ...................... 715/513 |
| 2005/0022116 | A1* | 1/2005 | Bowman et al. ............ 715/513 |
| 2006/0101058 | A1* | 5/2006 | Chidlovskii ................. 707/102 |
| 2007/0038927 | A1* | 2/2007 | Dallett et al. ............... 715/513 |
| 2008/0040657 | A1* | 2/2008 | Kuznetsov et al. .......... 715/234 |

OTHER PUBLICATIONS

Varlamis et al., Bridging XML-Schema and Relational Databases. A System for Generating and Manipulating Relational Databases Using Valid XML Documents, ACM 2001, pp. 105-114.*

(Continued)

Primary Examiner—Cong-Lac Huynh
(74) Attorney, Agent, or Firm—Blakely Sokoloff Taylor & Zafman

(57) ABSTRACT

A system and method for dynamic conversion of data to markup language format. A method for conversion of input data to a mark-up format comprises creating a logical structure for an output document in the markup format from a markup format definition, parsing the logical structure to obtain nodes and node attributes defined by the markup format definition; and generating a table of nodes based on the nodes of the logical structure. The nodes of the table are arranged based on requirements from the markup format definition and values are inserted for the nodes, with values being derived from the input data. An output document based on the logical structure is then generated.

21 Claims, 6 Drawing Sheets

OTHER PUBLICATIONS

Benedikt et al., DTD-Directed Publishing with Attribute Translation Grammars, ACM 2002, pp. 1-12.*

Bayerl et al., Methods for the Semantic Analysis of Document Markup, ACM 2003, pp. 161-170.*

Allen, Lindsey, et al., "Connecting to SAP From Microsoft Office InfoPath", Technical White Paper, (Apr. 2004), Whole Document.

Van Der Vlist, Eric, "Using W3C XML Schema", Published on XML.com http://www.xml.com/pub/a/2000/11/29/schemas/part1.html. (Nov. 29, 2000), Whole Document.

* cited by examiner

305 Generic structure for nodes of an XML document

| Component | Data type | Description |
|---|---|---|
| NTYPE | STRING | Node type e.g. Complextype |
| ELENM | STRING | Element name |
| ELETY | STRING | Element type within schema (e.g. a document scope complextype) |
| VALUE | STRING | Value (character) of the element within document |
| VALUE_AMT | CURR | Value (amount) of the element within document |
| REF | STRING | Referenced element/group |
| BASE | STRING | Base for element type |
| CTYPE | CHAR | Flag to determine of an element has children |
| PARENT_S | STRING | Parent node in schema |
| PARENT_P | STRING | Parent name of parent |
| PARENT | STRING | Parent node in XML document |
| MINOC | STRING | Minimum occurrence |
| GPMIN | STRING | Minimum occurence of group element |

310 Generic structure for attributes of an element

| Component | Data type | Description |
|---|---|---|
| ELENM | STRING | Element name |
| PARENT | STRING | Parent name of the element |
| ATTNM | STRING | Attribute name |
| ATTYP | STRING | Attribute type within schema |
| VALUE | STRING | Value of the attribute within document |
| ATUSE | STRING | Field indicating 'use' of the attribute |
| ATDEF | STRING | Field indicating default value of the attribute |
| FIXED | STRING | Field indicating fixed value of the attribute |
| REF | STRING | Referenced attribute group |

315 List of attributes within an attribute group

| Component | Data type | Description |
|---|---|---|
| ATTGP | STRING | Name of attribute group |
| ATTNM | STRING | Name of attribute |
| ATTYPE | STRING | Type of attribute within schema |
| VALUE | STRING | Value of attribute |
| ATUSE | STRING | Field indicating 'use' of the attribute |
| ATDEF | STRING | Field indicating default value of the attribute |
| FIXED | STRING | Field indicating fixed value of the attribute |

Fig. 3

DYNAMIC CONVERSION OF DATA INTO MARKUP LANGUAGE FORMAT

TECHNICAL FIELD

Embodiments of the invention generally relate to the field of computer data operations and, more particularly, to dynamic conversion of data to markup language format.

BACKGROUND

In the operation of a server or other system, data may require conversion into a certain format. In particular example, the system may utilize a markup language, such XML (extensible markup language) or a similar language, in operation. For example, an XML schema or other format definition may provide the format for a valid output document.

However, the process of conversion of data into XML or a similar format may require additional computer overhead whenever data structure changes are made. For example, in conventional operations in which data is converted according to a certain XML schema, a structure may be generated to represent the output. In this example, any modification of the schema, the elements of the schema, or attributes of such elements will result in a need for reprocessing of the output structure.

If a system or process involves fairly frequent modification of schemas, or includes a very large number of schemas, then data conversion may create a large computer overhead burden.

SUMMARY OF THE INVENTION

A system and method for dynamic conversion of data to markup language format.

According to first aspect of the invention, a method for converting input data to a markup format includes creating a logical structure for an output document from a markup format definition and parsing the logical structure to obtain nodes and node attributes. A table of nodes is generated based on the nodes of the logical structure, the nodes are arranged based on requirements from the format definition, and values are inserted for the nodes, with values being derived from the input data. An output document based on the logical structure is then generated.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 is an illustration of structures for dynamic conversion of data to XML format in an embodiment of the invention;

DETAILED DESCRIPTION

Figure 1:
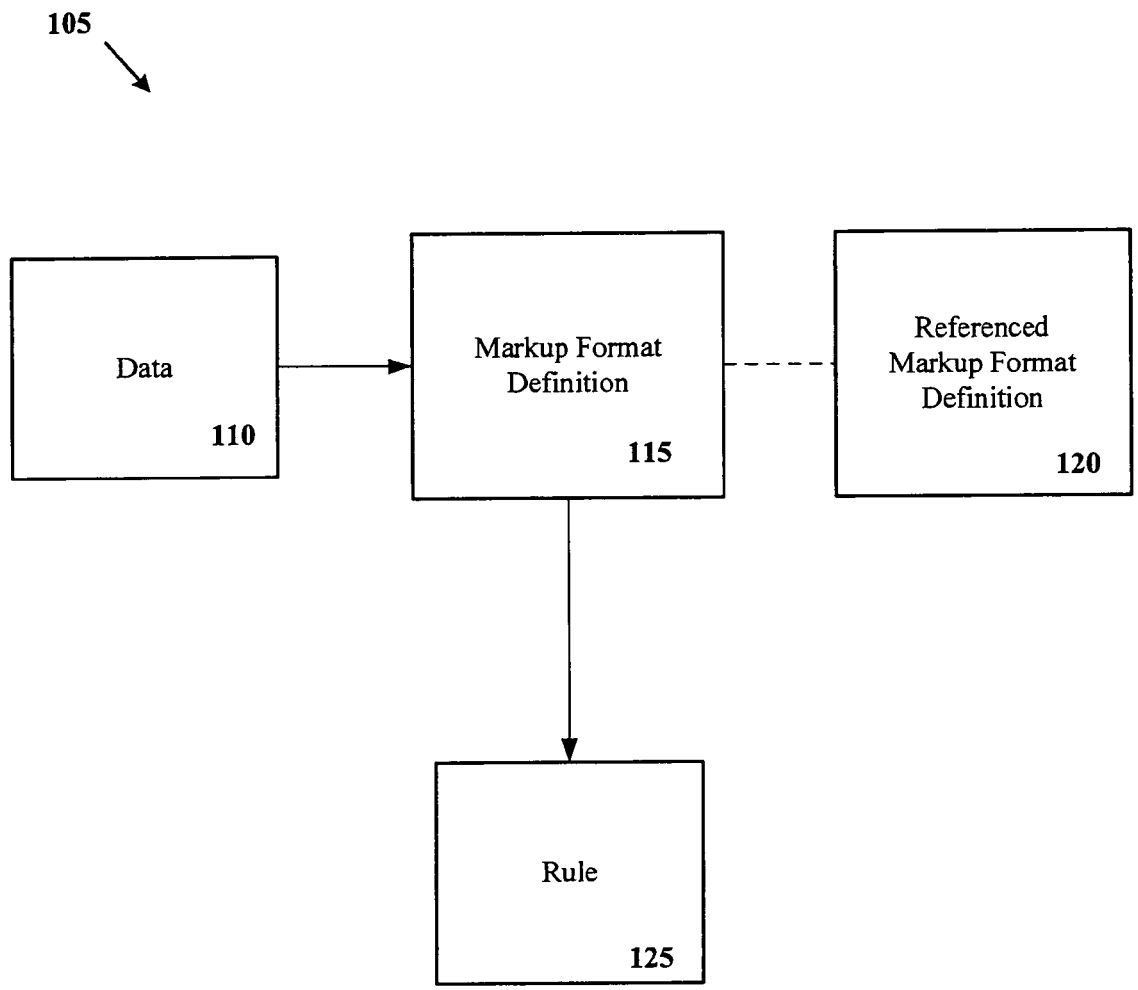
FIG. 1 is an illustration of conversion of data into markup language in an embodiment of the invention.

Embodiments of the invention are generally directed to a system and method for dynamic conversion of data into markup language.

In an embodiment of the invention, data is converted dynamically to a markup language, such as XML. In this embodiment, a tool is provided to more efficiently work with data by allowing conversion of data at runtime. In an embodiment of the invention, data is dynamically converted to a markup format according to markup format definition. A markup format definition may include an XML schema. According to the embodiment, the modification of a format definition does not affect a conversion process because the conversion is performed at runtime.

In one embodiment, a conversion of data to a markup format includes the dynamic creation of intermediate structures representing a tree structure for a markup document. In an embodiment, an intermediate structure is a logical document for each relevant markup format definition, such as each relevant XML schema.

While the discussion presented here generally refers to XML as an example, embodiments of the invention are not limited to XML. An embodiment of the invention will provide dynamic transformation to any markup format that represents data hierarchically. A markup language is a language providing formatting codes, such as codes for indicating layout and styling. A markup language or format includes XML, SGML (Standard Generalized Markup Language), and HTML (Hypertext Markup Language). The description of XML includes Extensible Markup Language (XML) 1.0 (Third Edition), Feb. 4, 2004, by the World Wide Web Consortium (W3C).

For the purposes of this application, a markup format definition or description defines the structure of data in a markup language or format. For example, a schema is a model for describing the structure of information. Specifically, a schema describes a model for a class of documents or files, describing the possible arrangement of tags and text that may exist in a valid document. In XML, a schema will represent a model for a class of documents or objects. The schema defines the legal elements of an XML document according to the schema and describes the possible arrangement of elements in a valid document. The definition will include such matters as the elements and attributes that can appear in a document, which elements are child elements and the order and number of child elements, whether an element is empty or can include text, the data types for elements and attributes, and any default or fixed values for elements and attributes. Another type of definition is a DTD (document type definition), an older format for documents that was derived from SGML, with XML being a reduced version or subset of SGML.

In an embodiment of the invention, a schema or other markup description, and any schemas that the schema refers to, are read dynamically. Upon uploading the relevant descriptions, each schema is converted into a logical document and then parsed to obtain the list of elements and element attributes defined by the schema. This list then may be stored and put in the form of an internal table. The list of elements in the table may not be in the same order as required in the output file and the data in the internal table is arranged to reflect the schema or schemas. The resulting structure then is populated with the required data and an output file is produced. In one embodiment of the invention, the XML leaf nodes generated are mapped with the corresponding original data fields to produce an XML file.

In one example, a class is generated for the conversion of data to XML format. In this embodiment, the class reads a schema at runtime and, based on the schema definition, the class creates intermediate structures representing the DOM (document object model). The schema and all other schemas that this schema refers to are then uploaded. A logical schema document is created for each such schema.

Each schema document is parsed to generate a list of nodes based on the schema definition. The list of nodes is arranged based on the relevant schema definitions. A list of attributes for each of the nodes in the list is then obtained.

A logical XML document is generated, and the nodes contained in the list are appended to the logical document. If attributes for the nodes are defined, then such attributes are created. If it is determined that any of the nodes are optional, such optional nodes then may be deleted. The encoding for the XML result then may be set. If encoding has been defined for a schema, then this encoding is set if no other value is supplied. The result of the operations is a dynamically generated XML document.

In an embodiment of the invention, the leaf nodes of a schema, which are the nodes that terminate and do not have any child nodes, are filled with the proper data and the data in the internal table is converted to XML format. In this manner, any future changes to the main schema or referenced schema will not require any maintenance. Further, an embodiment of the invention will allow for reading and converting any schema, and thus an embodiment provides a generic process for file conversion. An embodiment of the invention allows conversion of data to XML format with minimal maintenance effort.

In a conventional conversion of data to XML or another markup format, significant overhead may be required to maintain the data transformation in this example. For example, database tables may be needed to store information about the nodes of the markup document and the attributes of the nodes, or a structure may be needed to represent the document object model (DOM) or the output file, the DOM being an object representation of an XML document that represents an XML document as a tree of nodes. For example, a convention methods may include creation of a structure such as a DDIC (data dictionary) structure provided by SAP AG that represents the output XML tree With conventional methodology, a great deal of effort is required to maintain the conversion processes. For example, if a schema, the elements of the schema, or the attributes of such elements are changed at any point in the future, then the database table entries or the structure representing the DOM will need to be modified to reflect the change. Further, if a schema refers to one or more other schemas, then the same type of information for the other schemas needs to be maintained in a table or in a structure representing the schema. In an embodiment of the invention, the maintenance requirements for a large system are simplified by the implementation of dynamic conversion of data into the required formats.

FIG. 1 is an illustration of conversion of data into markup language in an embodiment of the invention. In this illustration, a dynamic conversion system 105 includes data 110 that requires conversion into a markup language format, which may include but is not limited to XML. In one example, the markup language format is a format that represents data hierarchically. The data output is required to match a markup format definition 115, which may be a schema or other similar file or definition. The markup format definition may refer to other definitions, such as the referenced markup format definition 120. In operation, the markup format definition may call one or more rules to process data, such as the illustrated rule 125. In an embodiment of the invention, the data is converted to markup language format dynamically during runtime. In the embodiment, an intermediate structure representing the markup format definition 115 and any other referenced markup format definitions 120 is generated and parsed to identify the needed elements or nodes of the output file. The nodes are ordered according to the required definition or definitions and are populated with the elements derived from the data 110.

Figure 2:
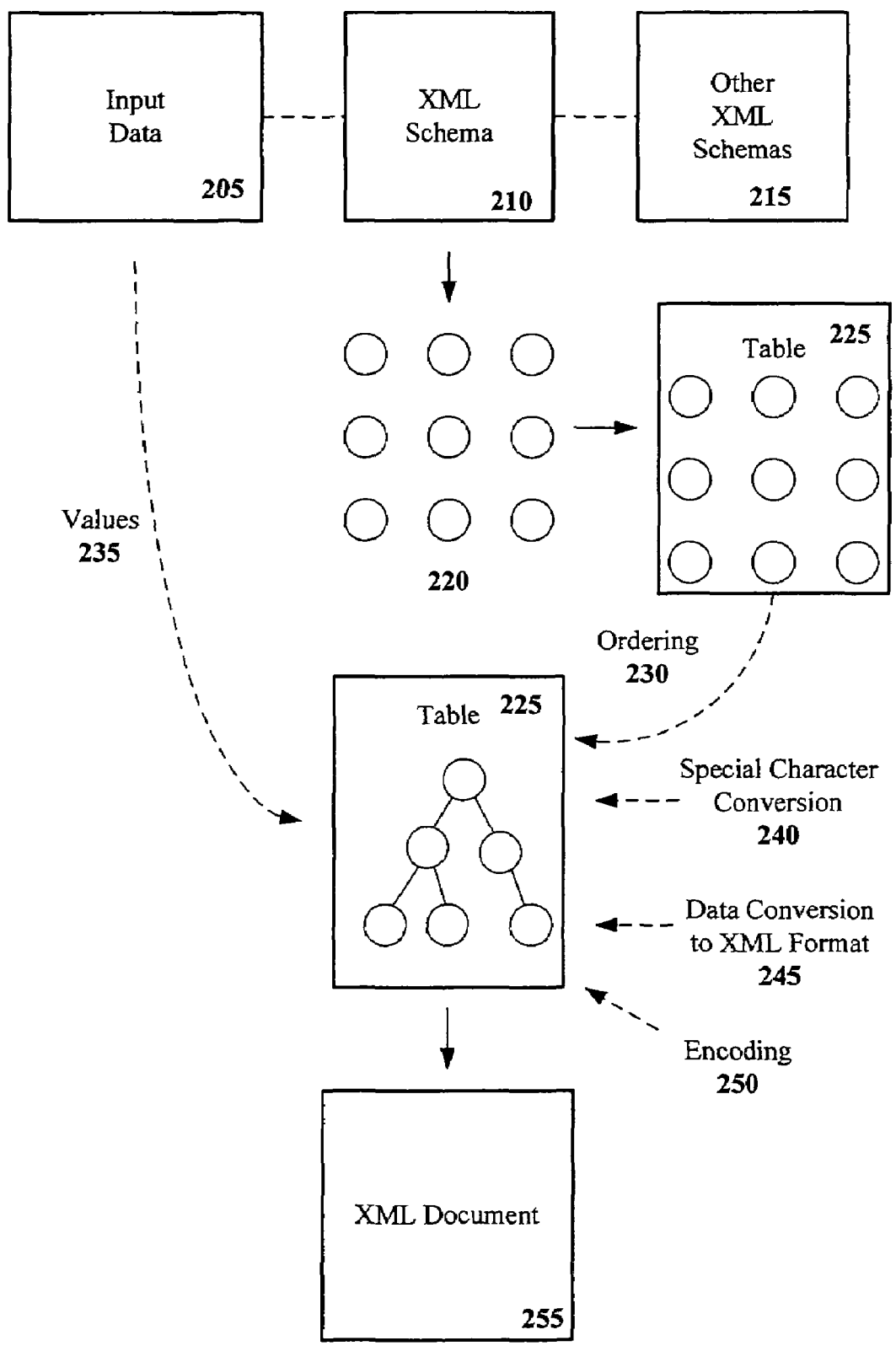
FIG. 2 is an illustration of a process for dynamic generation of an XML document according to a schema.

FIG. 2 is an illustration of a process for dynamic generation of an XML document according to a schema. In this illustration, input data 205 is obtained during a runtime operation. The input data 205 requires conversion according to an XML schema 210, which also refers to one or more other XML schemas 215. The XML schemas 210-215 may be converted to logical form and then parsed to identify the nodes 220 for the output file. The nodes 220 are stored in a table 225, which represents an intermediate structure for an output document. The nodes 220 are rearranged 230 to reflect the correct order of elements in a valid document according to the schemas 210-215.

The appropriate node values 235 are obtained from the input data 205 and the schemas 210-215. The schemas may provide for calculations of data and default values for elements. If any special characters require conversion for the output file, such characters are converted 240. The data in the table 225 then is converted to XML format 245. If needed, encoding for the output document is set 250. A logical XML document is then generated 255, which can then be downloaded as needed.

FIG. 3 is an illustration of structures for dynamic conversion of data to XML format in an embodiment of the invention. The structures are for use in the generation of an XML document during runtime. A first structure 305 is a generic structure for nodes of an XML document. The structure provides for components such as the element name and type, the value of the element, whether child nodes exist, and the identity of the parent node. A second structure 310 is a generic structure for the attributes of an element. The structure includes the element name, the parent name, the attribute name and type, the value of the attribute, and any default or fixed value of the attribute. A third structure 315 provides a list of attributes within an attribute group. The structure includes the name of the attribute group and the name of the attribute, the type and value of the attribute, and any default or fixed value of the attribute.

Figure 4:
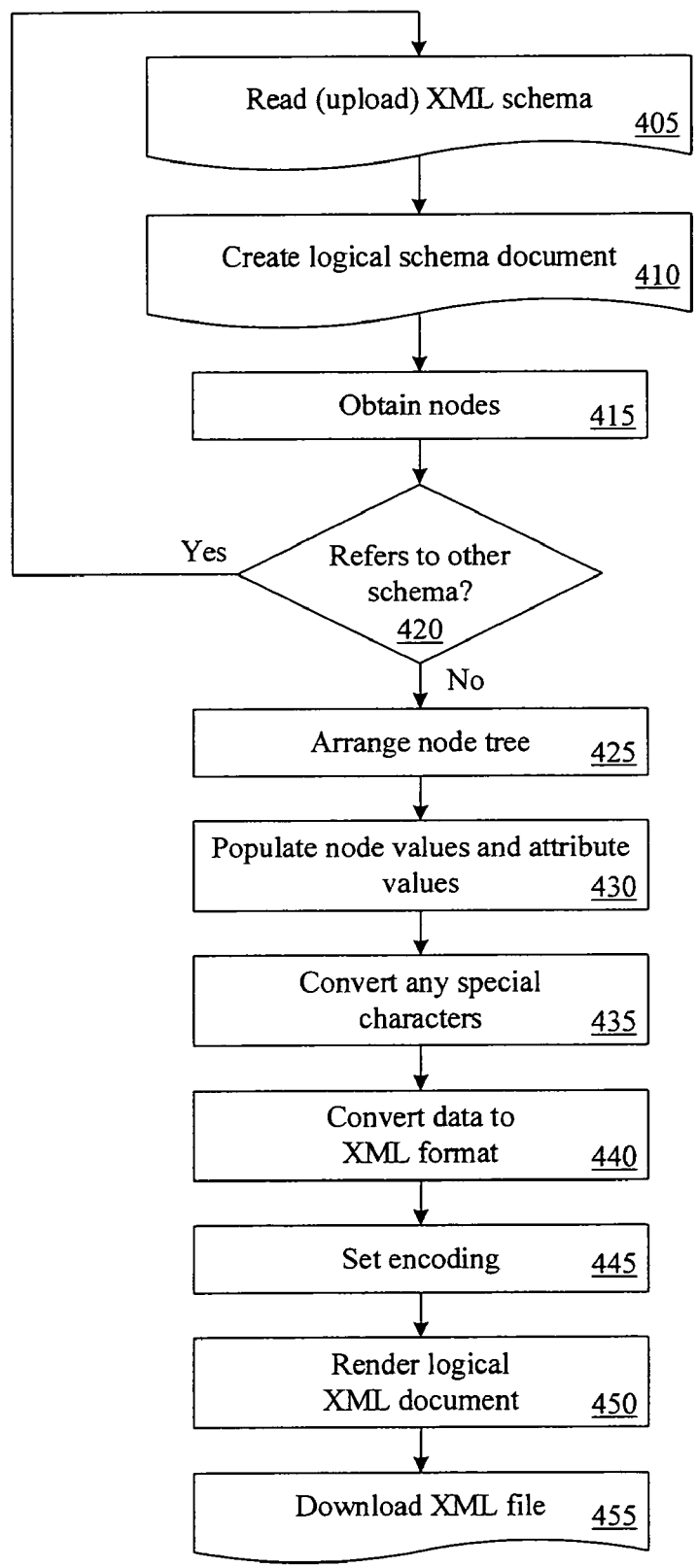
FIG. 4 is a flowchart to illustrate an embodiment of dynamic conversion of data to a markup language format.

FIG. 4 is a flowchart to illustrate an embodiment of dynamic conversion of data to a markup language format. In this illustration, data is converted dynamically to XML format at runtime. In the conversion process, the relevant XML schema is read, or uploaded 405. A logical schema document is produced based on the schema 410 and the nodes for the logical schema document are obtained 415. This process involves parsing the schema to determine what elements are needed for the produced XML document and using such elements as the nodes of the logical document. There is a determination whether the schema refers to one or more other schemas 420. If so, the process of producing the logical schema document is repeated for each of the referenced schemas 405-415.

When logical documents have been produced for each of the relevant schemas, the node tree is arranged to match the required XML output format 425. Then, using the data, the node values and attribute values are used to populate the nodes of the node tree 430. Any special characters are converted as needed 435, and the data contained in the node tree is converted to XML format 440. If needed, any encoding for the XML document is then set 445. The logical XML document can then be rendered 450 and the XML file can then be downloaded 455.

Figure 5:
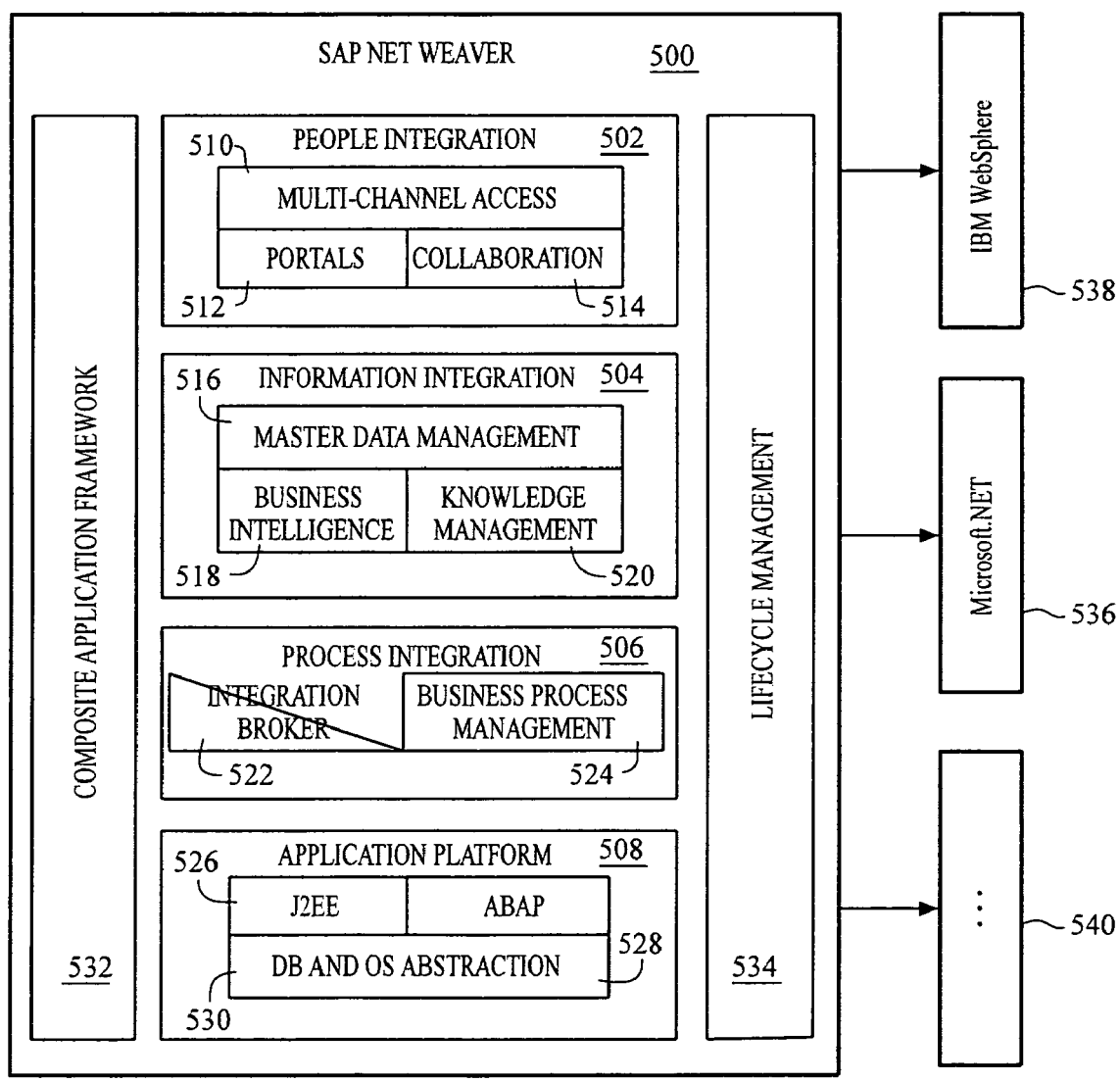
FIG. 5 is a diagram illustrating an embodiment of a system architecture.

FIG. 5 is a diagram illustrating an embodiment of a system architecture. In one embodiment, the diagram illustrates core components of the SAP NetWeaver architecture 500. The system architecture 500 comprises various SAP platforms that are merged together to provide the integration of people, information, and processes in one solution. The architecture 500 includes people integration 502, information integration 504, process integration 506, and an application platform 508.

People integration 502 is performed using a portal solution 512 and a platform to work in collaboration 514. Users are provided a multi-channel access 510 to ensure mobility. Examples of the portal solution 512 include SAP Enterprise Portal, SAP Mobile Engine, and Collaboration Package for SAP Enterprise Portal. Information integration 504 refers to the conversion of information into knowledge. Information integration 504 provides efficient business intelligence 518 and knowledge management 520 using, for example, SAP products such as Business Information Warehouse (BW) and Knowledge Management (KM). Further, consolidation of master data management beyond system boundaries is performed using SAP's Master Data Management (MDM) 516. Process integration 506 refers to optimized process management using integration broker or SAP exchange infrastructure 522 and business process management 524 techniques. Examples of products to perform process integration 506 include Exchange Infrastructure (XI) and Business Process Management (BPM).

An application platform 508 may include SAP's Web Application Server (Web AS), which is the basis for SAP applications. Web AS, which may be independent of the database and operating system 530, includes a J2EE engine 526 in combination with the proprietary ABAP (Advanced Business Application Programming) engine or instance 528 to further enhance the application platform 508. In one embodiment, the application platform 508 includes operation of a web service to provide an interface for heterogeneous external clients to manage systems provided by the application platform 508.

The architecture 500 further includes a composite application framework 532 to provide various open interfaces (APIs) and a lifecycle management 534, which is an extension of a previously existing transport management system (TMS). As illustrated, the architecture 500 further provides communication with Microsoft.NET 536, International Business Machine (IBM) WebSphere 538, and other such systems 540.

Figure 6:
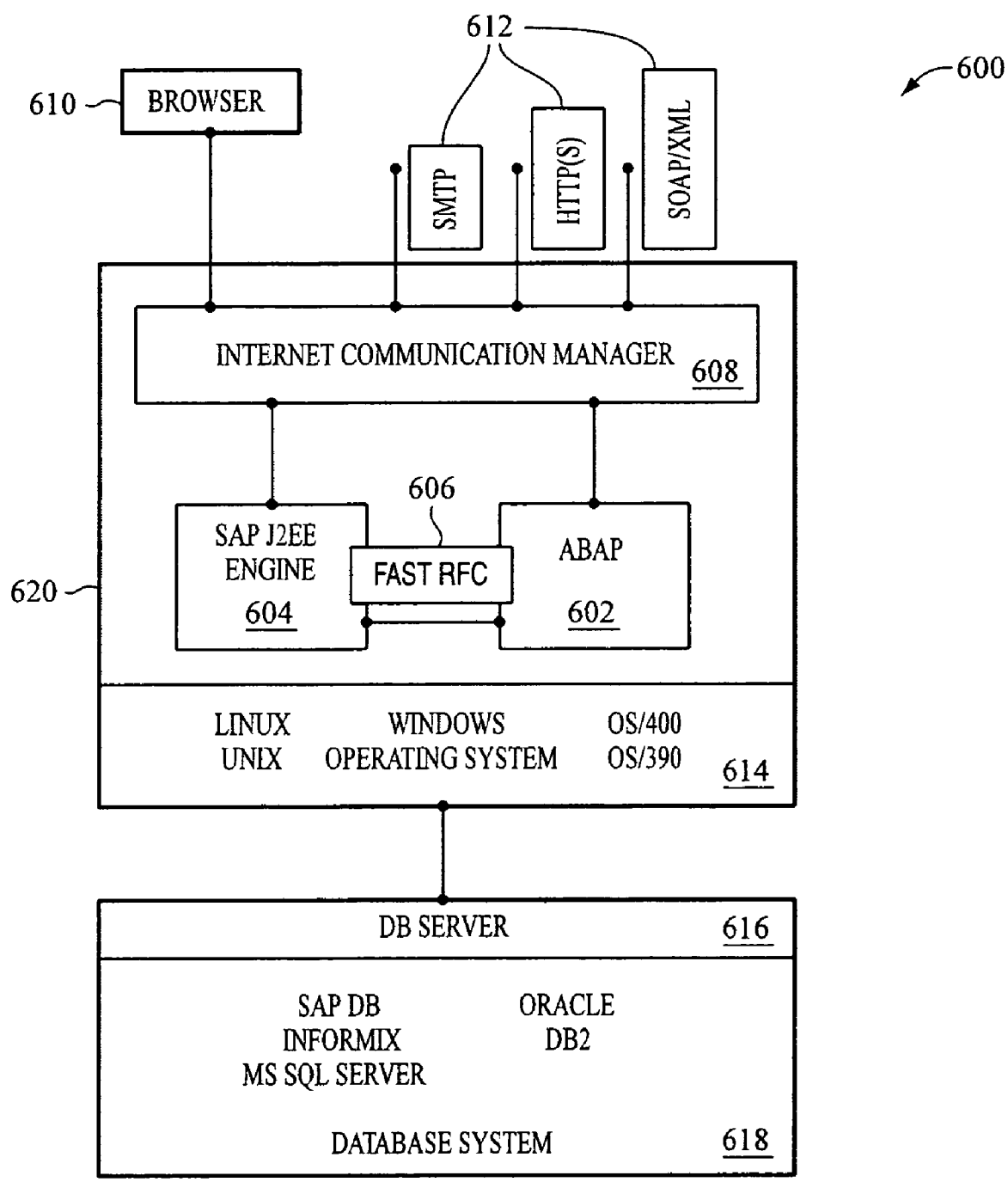
FIG. 6 is a block diagram illustrating an embodiment of an architecture including a Web Application Server.

FIG. 6 is a block diagram illustrating an embodiment of an architecture including a Web Application Server. In this illustration, an architecture 600 serves as an application platform (which may be, for example, the application platform 508 provided in FIG. 5) for SAP NetWeaver and other SAP products. The architecture 600 includes a Web AS 620 having an ABAP program engine 602, which provides the ABAP development and runtime environment, with the dependability, scalability, and inter-process independence of operating systems 614 and database systems 618. The operating system 614 may include LINUX, UNIX, Windows, OS/390, OS/400, and other such operating systems. The database system 618 may include SAP database (SAP DB), Informix, Oracle, DB2, and other such database systems. The database system 618 is based on a database server 616, such as Microsoft Sequential Query Language (MS SQL) server.

The Web AS 620 with ABAP engine 602 further includes a J2EE program engine 604. The J2EE may support one or more program instances. The J2EE engine 604 is in communication with the ABAP engine 602 via a fast Remote Function Call (RFC) connection 606. The ABAP engine 602 and the J2EE engine 604 are further in communication with an Internet Communication Manager (ICM) 608. The ICM 608 is provided for handling and distributing queries to various individual components of the architecture 600. The architecture 600 further supports a browser 610, such as Microsoft Internet Explorer, Netscape Navigator, and other modified variations of mobile end devices, such as personal digital assistants (PDAs), pocket computers, smart cell phones, other hybrid devices, and the like. The Web AS 620 also supports various protocols and standards 612, such as HyperText Markup Language (HTML), eXtensible Markup Language (XML), Wireless Markup Language (WML), Hypertext Transfer Protocol (HTTP) and Hypertext Transfer Protocol, Secure (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like. In one embodiment, the supported protocols 612 include SOAP and XML for the operation of web service to provide an interface for external management of systems on the Web AS 620.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for conversion of input data to a markup format comprising:

creating a logical structure for an output document in the markup format from a markup format definition;

parsing the logical structure to obtain nodes and node attributes defined by the markup format definition;

generating a table of nodes based on the nodes of the logical structure;

arranging the nodes of the table based on requirements from the markup format definition;

inserting values for the nodes, one or more of the values being derived from the input data; and generating an output document based on the logical structure.

2. The method of claim 1, wherein the markup format definition refers to a second markup format definition, and further comprising creating a second logical structure for the output document from the second markup format definition.

3. The method of claim 1, wherein the markup format represents data hierarchically.

4. The method of claim 1, wherein the markup format is XML (extensible markup language).

5. The method of claim 4, wherein the markup format definition is an XML schema.

6. The method of claim 1, wherein the conversion of the input data to the markup format occurs at runtime.

7. The method of claim 1, further comprising storing the node attributes in the table.

8. The method of claim 1, further comprising generating a second table based on the attributes of a node.

9. The method of claim 1, wherein one or more of the values inserted for the nodes is derived from the markup format definition as a calculation of data or a default value.

10. A server comprising:
   a memory for storage of input a markup format definition, and a logical document;
   an internal table for storage of a table to represent nodes of the logical document; and
   a processor to dynamically convert the input data to a markup format in conformance with the markup format definition, the conversion including converting the markup format definition to generate the logical document, parsing the logical document to identify nodes and node attributes for the markup format definition, using the result of the parsing to generate nodes of the table, and arranging the nodes of the table in accordance with the markup format definition.

11. The server of claim 10, wherein the markup format is XML (extensible markup language).

12. The server of claim 10, wherein the input data is converted dynamically at runtime.

13. The server of claim 10, wherein the markup format definition refers to one more other data format definitions.

14. The server of claim 13, wherein the conversion further includes converting the one or more other data format definitions to generate one more additional logical documents, and parsing the one or more additional logical documents to identify nodes and node attributes for the one or more data format definitions.

15. The server of claim 10, wherein the markup format definition comprises a schema.

16. The server of claim 10, wherein the markup format definition may be modified without modifying the conversion process for the input data.

17. A computer-readable medium having stored thereon data representing sequences of instructions that, when executed by a processor, cause the processor to perform operations comprising:
   creating a logical structure for an output document in XML (extensible markup language) from a schema;
   parsing the logical structure to obtain nodes and node attributes for an output document, and inserting the node elements into a table;
   arranging the nodes in the table based on requirements of the schema for a valid document;
   inserting a value for a node in the table, the value being derived from input data; and
   generating an output document for the input document based on the table in XML format.

18. The medium of claim 17, wherein the schema refers to a second schema.

19. The medium of claim 18, further comprising instructions that, when executed by the processor, cause the processor to perform operations comprising creating a second logical structure from the second schema and parsing the second logical structure to obtain nodes and node attributes for the output document.

20. The medium of claim 17, wherein conversion of input data to XML occurs at runtime.

21. The method of claim 17, further comprising inserting an attribute of an node in the table.

* * * * *